(12) United States Patent
Kalwa

(10) Patent No.: US 9,238,356 B2
(45) Date of Patent: Jan. 19, 2016

(54) METHOD FOR APPLYING A DECORATION TO A COMPOSITE WOOD BOARD

(75) Inventor: Norbert Kalwa, Horn-Bad Meinberg (DE)

(73) Assignee: FLOORING TECHNOLOGIES LTD., Pieta (MT)

( * ) Notice: Subject to any disclaimer, the term of this patent is extended or adjusted under 35 U.S.C. 154(b) by 206 days.

(21) Appl. No.: 13/882,693

(22) PCT Filed: Nov. 9, 2011

(86) PCT No.: PCT/EP2011/005626
§ 371 (c)(1),
(2), (4) Date: Apr. 30, 2013

(87) PCT Pub. No.: WO2012/062460
PCT Pub. Date: May 18, 2012

(65) Prior Publication Data
US 2013/0240137 A1 Sep. 19, 2013

(30) Foreign Application Priority Data
Nov. 10, 2010 (EP) ..................... 10014439

(51) Int. Cl.
| | | |
|---|---|---|
| B32B 38/14 | (2006.01) |
| B32B 37/00 | (2006.01) |
| B41F 3/00 | (2006.01) |
| B41M 1/38 | (2006.01) |
| B32B 38/00 | (2006.01) |
| B41M 3/00 | (2006.01) |
| B05D 7/06 | (2006.01) |
| B41M 1/10 | (2006.01) |
| B41M 5/00 | (2006.01) |
| B32B 38/10 | (2006.01) |
| B32B 37/02 | (2006.01) |

(52) U.S. Cl.
CPC ............. *B32B 38/145* (2013.01); *B05D 7/06* (2013.01); *B41M 1/10* (2013.01); *B41M 1/38* (2013.01); *B41M 3/008* (2013.01); *B41M 5/0047* (2013.01); *B41M 5/0076* (2013.01); *B32B 37/02* (2013.01); *B32B 38/10* (2013.01); *B41F 3/00* (2013.01); *Y10T 156/108* (2015.01)

(58) Field of Classification Search
CPC ..... Y10S 428/914; B41M 3/008; B41M 1/38; B44C 5/043; E04B 5/00; E04F 15/04; E04F 15/041; E04F 15/045; B32B 38/0004; B32B 38/10; B32B 2038/0004; B32B 2038/045; B32B 37/02; B41F 3/00; B41F 3/02; B41F 3/04; B41F 3/06; B41F 3/12; B41F 3/10
See application file for complete search history.

(56) References Cited

U.S. PATENT DOCUMENTS

| | | | | |
|---|---|---|---|---|
| 2,668,124 | A * | 2/1954 | Mallabar | 427/258 |
| 6,703,089 | B2 * | 3/2004 | DeProspero et al. | 428/32.76 |
| 2002/0061389 | A1 * | 5/2002 | Brooker et al. | 428/195 |
| 2005/0249924 | A1 | 11/2005 | Reichwein et al. | |
| 2007/0196624 | A1 | 8/2007 | Chen et al. | |
| 2011/0059239 | A1 | 3/2011 | Oldorff | |
| 2011/0203724 | A1 * | 8/2011 | Stokes et al. | 156/221 |
| 2013/0088556 | A1 * | 4/2013 | Hagspiel | 347/110 |

FOREIGN PATENT DOCUMENTS

| | | | | |
|---|---|---|---|---|
| CN | 1972799 | A | 5/2007 | |
| CN | 201002295 | Y | 1/2008 | |
| CN | 101287806 | A | 10/2008 | |
| CN | 101823405 | A | 9/2010 | |
| DE | 102007012236 | A1 | 9/2008 | |
| EP | 1454763 | | 9/2004 | |
| EP | 1762400 | A1 | 3/2007 | |
| EP | 1839884 | A1 | 10/2007 | |
| EP | 1918095 | A1 | 5/2008 | |
| EP | 2098380 | A2 | 9/2009 | |
| JP | 2001071446 | A | 3/2001 | |
| RU | 2086416 | * | 8/1997 | ............... B27M 3/24 |
| WO | WO-2009087440 | | 7/2009 | |
| WO | WO-2011110373 | | 9/2011 | |
| WO | WO-2011110381 | | 9/2011 | |

OTHER PUBLICATIONS

International Preliminary Report on Patentability for Application No. PCT/EP2011/005626, date of issuance—May 14, 2013, 6 pages.
Search Report for CN Related Application No. 201180053977.4, dated Sep. 16, 2014, 3 pages.

* cited by examiner

*Primary Examiner* — Linda L Gray
(74) *Attorney, Agent, or Firm* — Andrew M. Calderon; Roberts Mlotkowski Safran & Cole, P.C.

(57) ABSTRACT

The invention relates to a method for applying a decoration to the upper face of a composite wood board, in particular a MDF or HDF board, wherein said method is characterized in that at least one second decoration produced by digital printing is applied to a first decoration produced by intaglio printing.

12 Claims, No Drawings

METHOD FOR APPLYING A DECORATION TO A COMPOSITE WOOD BOARD

1. FIELD OF THE INVENTION

The invention relates to a method for applying a decoration to a composite wood board, in particular an MDF or HDF board.

2. DISCUSSION OF BACKGROUND INFORMATION

A method of this type is known, for example, from DE 10 2007 012 236 A1. First of all, a decoration layer is applied to the surface of a composite wood board which can be subsequently processed further, for example, to produce floor panels or can be used as a furniture board. A sealing varnish layer is applied to the decoration layer and a structure is embossed into the completely hardened varnish layer. The structuring takes place by way of an embossing calender or an intermittently operated press with temperature and pressure loading. Before the application of the decoration layer onto the upper side of the carrier board, a color layer can previously be printed on as carrier layer. The carrier layer can also be composed of paper. The decoration of the decoration layer is preferably a wood or stone reproduction. However, a cork, leather or tile visual appearance can also be produced instead of a wood decoration. As a result of the structure which is embossed into the varnish layer and corresponds, for example, to the grain of the wood decoration or the vein patterns of the stone reproduction, a particularly natural visual appearance of the finished composite wood board is achieved.

EP 1 918 095 A1 has disclosed a composite wood board with a core of wood material, which composite wood board has a real wood veneer layer on its upper side. The surface of the veneer layer is printed with at least one ink application which changes the decoration. The printing takes place in such a way that the decoration of the veneer changes visually to a different real wood decoration. The veneer layer can be printed in an analog and digital manner.

Since the introduction of digital printing in the wood industry, more and more products are finished with the aid of this technology. There are a wide variety of reasons for this. The essential reason for using digital printing consists in the fact that considerably better print quality can be achieved in comparison with analog printing processes (gravure printing). Firstly, higher resolutions can be achieved by way of digital printing and secondly digital printing is not restricted in relation to the possible colors, as is the case, for example, in gravure printing. As a result, new color spaces can be opened up by the use of digital printing, which new color spaces are not accessible by means of a gravure printing process. In analog printing, impression rolls with a circumference of up to approximately 1.4 m are used. However, the composite wood boards can be produced in every desired length, and even in an endless manner. As a result of the limitation of the roll circumferences, the printing motif is then repeated again and again. If the composite wood boards are subsequently divided into individual panels and used, for example, as a floor covering, the result is an artificial decoration image which is always found again at various points in the floor covering as a result of the repetitions of the decoration. The floor covering can be recognized as an "artificial" product. Real wood panels or natural stone tiles do not have a repeating decoration. Each real wood panel/each natural stone tile is provided with an individual decoration, with the result that no floor panel is the same as another. The decoration is distributed randomly over the floor covering.

Decorations which are only repeated after considerably more than 40 m can be realized using digital printing. In principle, decorations which are completely without repetitions are even possible. Considerably greater options are also available to digital printing with regard to the color spaces than in the case of analog printing. In digital printing, composite wood boards can therefore be finished, the decoration of which is distributed randomly and, if composite wood boards of this type are then later processed further to produce floor coverings, a random distribution of the decoration is achieved, as is customary in the case of real wood or natural stone floors.

It is a disadvantage in the use of digital printing, however, that the printing inks are considerably more expensive than the printing inks for gravure printing. For this reason, the production costs of digitally printed composite wood boards lie considerably above those of analog printed boards. In addition, digital printing is slower than gravure printing, which likewise results in high production costs.

SUMMARY OF THE INVENTION

Proceeding from this, the method for applying a decoration to the upper side of a composite wood board, in particular an MDF or HDF board, is intended to be improved.

DETAILED DESCRIPTION OF THE PRESENT INVENTION

In order to solve the problem, the method which is described is distinguished by the fact that at least one second decoration which is produced using digital printing is applied to a first decoration which is produced using gravure printing. As a result of the combination of gravure and digital printing, first of all a "base coat" is applied using classic gravure printing. In the case of a wood decoration, for example, these are the colors which are responsible for the basic color tone. The grain, the knotholes and other decorative elements are subsequently applied to the gravure print by way of digital printing. This ensures that decorations can be produced which are printed without regions which are repeated. The necessary large-area printing takes place by way of the inexpensive gravure printing process and the "more delicate" printing takes place by way of the more expensive digital printing process. Since the proportion of the decoration which is printed by means of the slower digital printing is only relatively low using the method according to the invention, since the large-area printing takes place by way of the gravure printing process, the required production time is reduced and therefore the productivity is increased in comparison with complete printing using digital printing. This also contributes to the reduction of costs.

It is of particular advantage in this solution that the two print applications can be applied either directly after one another in a plant or in two work processes which are connected after one another. This might take place, for example, as a process based on the division of labor. The gravure printing might be carried out onto paper by a printing works. The paper is delivered to the wood material producer in reels, which wood material producer subsequently carries out the digital printing, for example by way of an inkjet printer, and can therefore produce a solution which is individual for his customers. It is only necessary here that the printing works makes the data for the gravure printing available to the wood material producer for his further processing.

The paper layer can be printed with the second decoration before it is connected to the composite wood board. The paper layer is preferably pressed with the composite wood board.

It has proved particularly advantageous if the paper layer with the first decoration is present as a reel. This is then finished "from reel to reel". Here, the second decoration is printed by means of a digital printer onto the paper reel which has already been printed with the first decoration. The paper layer is preferably rolled up again to produce a reel afterward. However, it can also be processed further directly and can be placed onto the composite wood boards which are to be coated. As a result of this refinement, it is possible to outsource the base coat, that is to say the printing of the paper layer with the large-format print using the gravure printing process, to an external printing works. Production costs can be reduced as a result. The "delicate" printing using digital printing can then take place at the finisher of the composite wood boards himself. As a result, a standard print using gravure printing can be used to a great extent without repetitions occurring in the decoration of the finally finished composite wood board. A "random design", that is to say a random distribution of the individual decoration elements, therefore becomes possible in a particularly simple manner, with the result that a repetition in the decoration can therefore almost virtually be ruled out if it is not desired. As a result, the printing of the second decoration using digital printing is simplified considerably in comparison with printing by means of a flatbed printer, in which individual sheets or pages of the paper layer have to be printed and first of all fixed for this purpose, as a result of which the production duration and therefore the costs are reduced.

The finally printed reel is subsequently laminated onto the composite wood board to be finished. Subsequently, it can be covered with one or more protective layers, for example varnish layers, which then harden under the influence of high-energy radiation, for example electron beams.

In one particularly preferred embodiment, composite wood boards which have already been cut to size in a plant are pushed together by conveyor belts by way of different speeds to produce an "endless board". The individual composite wood boards are therefore arranged so closely behind one another that only a minimum spacing, preferably no spacing, lies between them. In this case, the paper layer which is printed with the second decoration and the first decoration which lies underneath the latter can be applied to the composite wood boards as an "endless" reel and is cut to the dimension and the size of the composite wood board only after the laminating and pressing to the composite wood board. This can take place by way of a simple blade, for example a knife.

Of course, the upper side of the composite wood board can also be printed directly, that is to say without paper layer, using gravure printing and subsequently the digital printing technology can be used.

A sealing layer can be applied as base coat layer to the upper side of the composite wood board before the analog printing of the decoration. To this end, it can be advantageous to grind the upper side before the further treatment, which can of course also be advantageous without additional application of the decoration layer.

If the two decorations are applied directly to the upper side of the board, not only the known problem which is associated with the paper growth is dispensed with, but also the handling which is associated with placing the paper web onto the board upper side, as a result of which the production is simplified.

A possible sequence of steps for finishing a composite wood board results as follows:

a) application of a sealing layer made from melamine resin to the upper side of the board, b) printing of a first decoration onto the sealing layer using the gravure printing process, c) printing of a second decoration onto the first decoration by way of a digital printer, d) application of a protective layer of melamine resin to both decorations, e) pressing of the plate under the action of temperature, until the protective layer and the sealing layer melt and are connected to one another with the inclusion of the printed first and second decorations.

The application of the sealing layer to the upper side of the composite wood board prevents the printing ink from being absorbed by the composite wood board, which would be the case without the sealing layer, since the composite wood board is absorbent per se. As a result of the sealing layer, the decoration ink is held on the surface and is bonded, with the result that the first and second decoration layers remain on the surface and a precise, clearly visible decoration is formed. The covering layer as protective layer of melamine resin replaces the known overlay which is placed onto the decoration paper in the case of the further known finishing processes. As a result of the subsequent pressing under the action of temperature until the protective layer and the sealing layer melt, the decoration is enclosed and the sealing layer and the protective layer become a composite. The gloss level of the surface can be set with the aid of the press. If a polished press plate is used, a high-gloss surface is achieved.

The decoration can also be applied to the underside of the composite wood board.

The sealing layers and/or the protective layers are preferably applied in a plurality of individual layers, each individual layer drying sufficiently before the application of the next layer. The printing ink can also be applied in a plurality of layers in analog printing. In order that the decoration or the ink layer does not melt or change color during pressing, a correspondingly heat-resistant ink or a heat-resistant varnish has to be used. If the board is ground before the application of the first layer, a particularly smooth surface is achieved subsequently. In order to increase the wear resistance, corundum can be mixed or scattered into the protective layer. Antibacterial and/or antistatic additives can also be added or scattered in.

The finishing of the upper side of the board can also take place only in regions. The entire upper side of the composite wood board is then printed in the base color using gravure printing. Subsequently, only individual regions are treated using digital printing. For example, in the case of a wood decoration, the grain or any desired knotholes or the like are applied using digital printing. It is therefore possible to produce very small batch sizes. A large-format composite wood board with the identical base color which was produced using gravure printing can be provided with different wood decorations. Panels can subsequently be cut from the large-format composite wood board, which panels are identical in color but differ in terms of their wood decoration. Thus, for example, different wood decorations can also be "mixed" if this is desired for esthetic reasons, for example in the design of the object.

Moreover, it is also possible to change over the production very rapidly, by another decoration being produced using digital printing, without changing the base color which is used during gravure printing. The flexibility is increased as a result.

If the first decoration is printed onto a paper layer, this can take place in a printing works and the decoration can be delivered to the wood material producer as reel or stack goods. In order to coat the composite wood boards with the decoration paper, a plurality of individual boards can be fed to a coating plant such that they abut one another directly, and the decoration paper can be pulled off from the reel and placed on them. The printing of the decoration paper using gravure printing and digital printing takes place in precisely the same way per se, as was previously described during the direct printing of the upper side of the composite wood board. The decoration paper which is placed in an endless manner onto the composite wood boards is then printed with the second decoration, for example, by means of an inkjet printer. Subsequently, the covering layer is applied in liquid form or is applied in the form of an endless overlay paper. The composite of composite wood board, decoration paper and covering layer is then pressed with one another in a continuous press under high pressure and at high temperature. It is also conceivable to sever the decoration and covering layers which are applied to the composite wood boards at the end of the coating plant between the individual composite wood boards which are guided through so as to adjoin one another, and to then press the composite in an intermittently operated press.

It is likewise conceivable to place the decoration as an individual layer in each case onto the upper side of a composite wood board, then to print the second decoration using digital printing, to cover with a known overlay and to press the composite in an intermittently operated press.

Both in the case of direct printing of the upper side of a composite wood board and also in the case of printing of a paper layer, a plurality of digital printers can be arranged behind one another in the transport direction, in order to print the second decoration or even a further or a plurality of further decorations. A plurality of gravure printing devices can also be provided behind one another in the transport direction, in order to apply the decoration to the upper side of the composite wood board using gravure printing.

The invention claimed is:

1. A method for applying a decoration to an upper side of a composite wood board, comprising a first decoration that is printed directly onto at least one upper side of the composite wood board by using gravure printing and at least one second decoration being applied to the first decoration by using digital printing, and applying a sealing layer as a base coat layer onto the upper side of the composite wood board before the first decoration is printed to prevent a printing ink from being absorbed by the composite wood board, wherein the first decoration comprises colors which define a basic color tone of a finished decoration and the at least second decoration comprises details which define the type of the finished decoration.

2. The method as claimed in claim 1, wherein the first decoration is printed onto a paper layer which is connected to the composite wood board.

3. The method as claimed in claim 2, wherein the second decoration is printed onto the first decoration on the paper layer before the paper layer is connected to the composite wood board.

4. The method as claimed in claim 3, wherein the paper layer with the first decoration is present as a reel.

5. The method as claimed in claim 2, wherein the paper layer is pressed with the composite wood board.

6. The method as claimed in claim 5, wherein, after pressing with the composite wood board, the paper layer is cut to a size of the composite wood board.

7. The method as claimed in claim 2, further comprising covering the second decoration by a transparent covering layer.

8. The method as claimed in claim 1, wherein the upper side of the composite wood board is ground before the application of the first decoration.

9. The method as claimed in claim 1, wherein the second decoration imitates a natural decoration.

10. The method as claimed in claim 1, wherein the second decoration does not have any regions which are repeated in a pattern.

11. The method as claimed in claim 1, wherein the second decoration has a random pattern.

12. The method as claimed in claim 7, wherein the covering layer has a structural embossment which corresponds completely with the second decoration.

* * * * *